(12) United States Patent
Park et al.

(10) Patent No.: US 8,794,810 B2
(45) Date of Patent: *Aug. 5, 2014

(54) BACKLIGHT ASSEMBLY AND LIQUID CRYSTAL DISPLAY HAVING THE SAME

(71) Applicant: Samsung Display Co., Ltd., Yongin (KR)

(72) Inventors: Se Ki Park, Suwon-si (KR); Gi Cherl Kim, Yongin-Si (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/895,797

(22) Filed: May 16, 2013

(65) Prior Publication Data

US 2013/0250210 A1     Sep. 26, 2013

Related U.S. Application Data

(63) Continuation of application No. 11/683,306, filed on Mar. 7, 2007, now Pat. No. 8,444,296.

(30) Foreign Application Priority Data

Sep. 8, 2006   (KR) .................. 10-2006-0086948

(51) Int. Cl.
*F21V 7/04*      (2006.01)
*G02F 1/1335*    (2006.01)

(52) U.S. Cl.
CPC ............ *G02F 1/1336* (2013.01); *G02B 6/0068* (2013.01); *G02F 1/133603* (2013.01); *G02B 6/0086* (2013.01); *G02B 6/003* (2013.01)
USPC .......................................... 362/608; 362/621

(58) Field of Classification Search
USPC .................. 362/608, 621, 555, 612
See application file for complete search history.

(56) References Cited

U.S. PATENT DOCUMENTS

| | | | |
|---|---|---|---|
| 4,129,628 A | 12/1978 | Tamutus | |
| 5,694,246 A * | 12/1997 | Aoyama et al. | 359/619 |
| 5,836,676 A * | 11/1998 | Ando et al. | 362/244 |
| 5,893,633 A | 4/1999 | Uchio et al. | |
| 5,924,788 A * | 7/1999 | Parkyn, Jr. | 362/329 |
| 6,498,355 B1 | 12/2002 | Harrah et al. | |
| 6,733,147 B2 | 5/2004 | Wang et al. | |

(Continued)

FOREIGN PATENT DOCUMENTS

| | | |
|---|---|---|
| JP | 10-260404 | 9/1998 |
| JP | 2000-348517 | 12/2000 |

(Continued)

*Primary Examiner* — Julie Bannan
(74) *Attorney, Agent, or Firm* — H.C. Park & Associates, PLC

(57) ABSTRACT

A backlight assembly and a liquid crystal display having the same are provided. The backlight assembly includes a plurality of LED packages mounted on a substrate, and a lens unit that seals the LED packages. The lens unit includes a plurality of convex lenses arranged to partially overlap with each other or arranged proximate to each other. Light emitted from LED units in the LED packages is diffused by the interface between the lens unit and another material, such as air, to provide light incident on a light guide plate.

19 Claims, 10 Drawing Sheets

(56) References Cited

U.S. PATENT DOCUMENTS

| | | | |
|---|---|---|---|
| 6,824,286 | B2 | 11/2004 | Sugiyama |
| 6,936,855 | B1 | 8/2005 | Harrah |
| 2004/0109664 | A1 | 6/2004 | Ohtsuki et al. |
| 2004/0218388 | A1 | 11/2004 | Suzuki |
| 2005/0007516 | A1 | 1/2005 | Hong et al. |
| 2005/0116238 | A1 | 6/2005 | Arndt et al. |
| 2005/0141244 | A1 | 6/2005 | Hamada et al. |
| 2006/0198144 | A1* | 9/2006 | Miyairi et al. ............ 362/257 |
| 2007/0091602 | A1 | 4/2007 | van Voorst Vader et al. |
| 2007/0171670 | A1* | 7/2007 | Zagar et al. ............... 362/601 |
| 2007/0236934 | A1 | 10/2007 | Chang et al. |
| 2008/0043466 | A1* | 2/2008 | Chakmakjian et al. ...... 362/237 |

FOREIGN PATENT DOCUMENTS

| | | |
|---|---|---|
| JP | 2002-43630 | 2/2002 |
| JP | 2004-102132 | 4/2004 |
| JP | 2004-325959 | 11/2004 |
| JP | 2006-100575 | 4/2006 |
| KR | 1020030061153 | 7/2003 |
| KR | 1020040071066 | 8/2004 |
| KR | 1020050097164 | 10/2005 |
| KR | 1020050112641 | 12/2005 |
| KR | 1020060002589 | 1/2006 |
| KR | 1020060023665 | 3/2006 |
| KR | 1020060030350 | 4/2006 |
| KR | 1020060059581 | 6/2006 |
| KR | 1020060059888 | 6/2006 |

* cited by examiner

BACKLIGHT ASSEMBLY AND LIQUID CRYSTAL DISPLAY HAVING THE SAME

CROSS-REFERENCE TO RELATED APPLICATIONS

This application is a continuation application of U.S. patent application Ser. No. 11/683,306, filed on Mar. 7, 2007 (U.S. Pat. No. 8,444,296 to issue on May 21, 2013) and claims priority from and the benefit of Korean Patent Application No. 10-2006-0086948, filed on Sep. 8, 2006, which are all hereby incorporated by reference for all purposes as if fully set forth herein.

BACKGROUND OF THE INVENTION

1. Field of the Invention

The invention relates to a backlight assembly and a liquid crystal display (LCD) having the same. More specifically, the present invention relates to a backlight assembly that may reduce a hot spot due to dark and bright portions of a Light Emitting Diode (LED) lamp by providing a lens unit including convex lenses on the LED lamp and including a plurality of LED packages, and to a liquid crystal display having the backlight assembly.

2. Discussion of the Background

LCDs are not self-luminous and therefore may have lower definition when viewed in a location having little light. Accordingly, the LCDs commonly include a light source, such as a backlight for increasing the brightness of the LCD's displayed image.

A backlight used in an LCD may be one of at least two types, including an edge type or a direct type, which are classified according to the position of the light source. In the edge type backlight, a light source is positioned along an edge of an LCD panel, and light emitted from the light source is irradiated onto the LCD panel through a light guide plate positioned below the LCD panel. In the direct type backlight, light sources are disposed below the LCD panel to directly irradiate light onto the entire surface of the LCD panel. Generally, the edge type backlight may provide good uniformity of light, while the direct type may allow the LCD to be thinner.

A cold cathode fluorescent lamp (CCFL) has been used as the backlight light source for the edge type. Recently, however, an LED lamp has been increasingly used since an LED lamp may have a long lifespan and low power consumption, and may allow the LCD to be lightweight and thinner.

A conventional LED lamp includes a plurality of LED packages that emit light, and provides light distribution to the LCD by emitting light from the LED packages as point sources. Light from the point light sources is then converted into surface light by a light guide plate.

However, since the LED lamps are point light sources, the amount of light incident on a side of the light guide plate may be not uniform. More specifically, the amount of light irradiated onto a region of the light guide plate close to each LED package may be greater than the amount of light irradiated onto a region of the light guide plate between the LED packages. For this reason, a hot spot may occur, where a region of the backlight is bright while an adjacent region is darker.

SUMMARY OF THE INVENTION

This invention provides a backlight assembly that improves the diffusion of light emitted from a plurality of LED packages and incident on a light guide plate, thereby reducing a hot spot, and a liquid crystal display having such a backlight assembly.

Additional features of the invention will be set forth in the description which follows, and in part will be apparent from the description, or may be learned by practice of the invention.

The present invention discloses a light source module including a substrate, a plurality of light-emitting diode (LED) packages arranged on the substrate, and a lens unit comprising a plurality of lenses partially overlapping with each other, the lens unit to seal the plurality of LED packages.

The present invention also discloses a backlight assembly including a light source that includes a substrate, a plurality of light-emitting diode (LED) packages arranged on the substrate, and a lens unit comprising a plurality of lenses partially overlapping with each other to seal the plurality of LED packages. The backlight assembly also includes a light guide plate to emit light incident from the light source and a housing member to house the light source and the light guide plate.

The present invention also discloses a backlight assembly including a plurality of light sources, and a housing member to house the light sources. A light source includes a substrate, a plurality of LED packages arranged on the substrate, and a lens unit comprising a plurality of lenses partially overlapping with each other to seal the LED packages.

The present invention also discloses a backlight assembly including a light source comprising a substrate, a plurality of LED packages arranged on the substrate to emit light, and a lens unit comprising a plurality of semi-ellipsoidal lenses arranged proximate to each other to seal the LED packages. The backlight assembly also includes a light guide plate to emit light incident from the light source, and a housing member to house the light source and the light guide plate.

The present invention also discloses a liquid crystal display including a liquid crystal display panel to display an image, a backlight assembly to emit light onto the liquid crystal display panel, and a housing member to house the liquid crystal display panel and the backlight assembly. The backlight assembly comprises a substrate, a plurality of LED packages arranged on the substrate to emit light, and a lens unit comprising a plurality of lenses partially overlapping each other, the lens unit to seal the LED packages.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
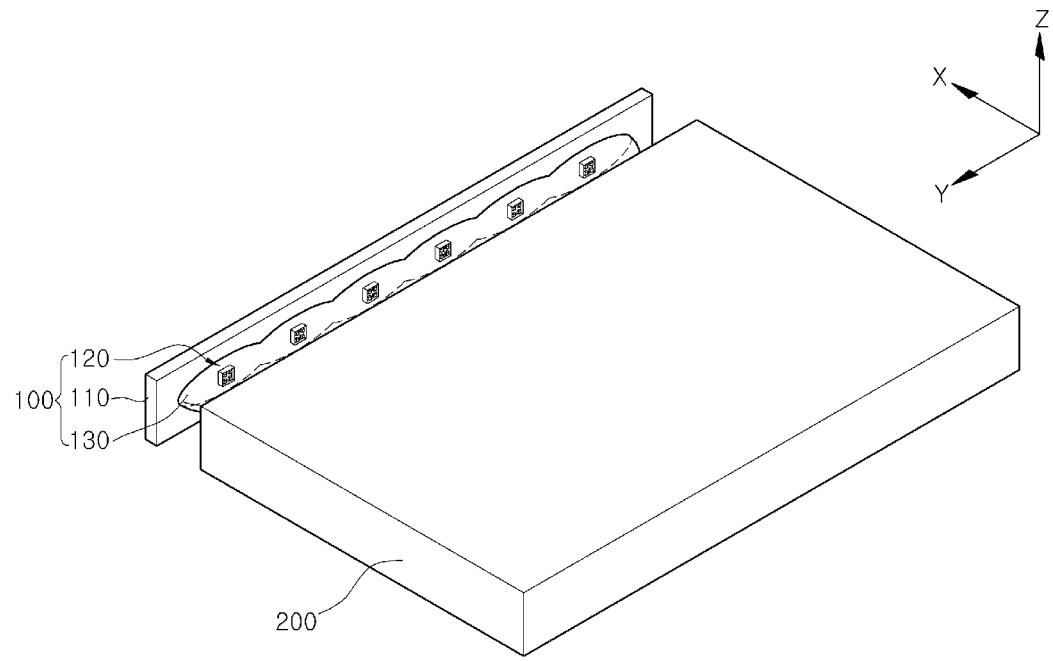
FIG. 1 is a perspective view of a backlight assembly according to a first exemplary embodiment of the invention.

Hereinafter, exemplary embodiments of the invention will be described in detail with reference to the accompanying drawings. The present invention may, however, be embodied in many different forms and should not be construed as being limited to the exemplary embodiments set forth herein. Rather, these exemplary embodiments are provided such that this disclosure will be thorough and complete and will fully convey the concept of the invention to those skilled in the art. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below," "lower", "under," "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from conventional tolerances during the manufacturing process.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
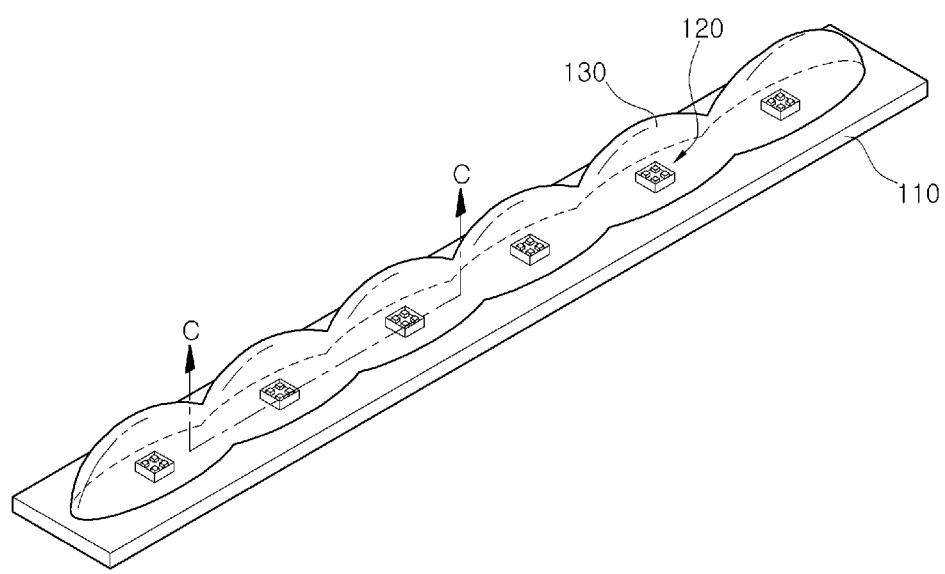
FIG. 2 is a perspective view of an LED lamp according to the first exemplary embodiment.
Figure 3:
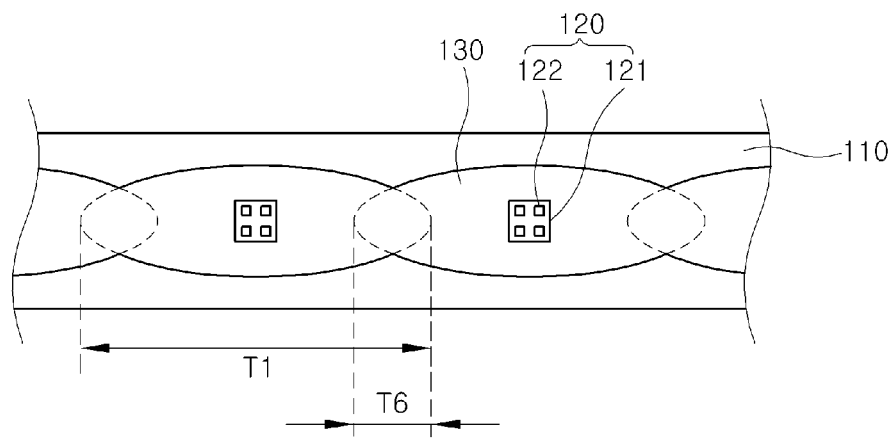
FIG. 3 is a partial plan view of the LED lamp shown in FIG. 2.
Figure 4:
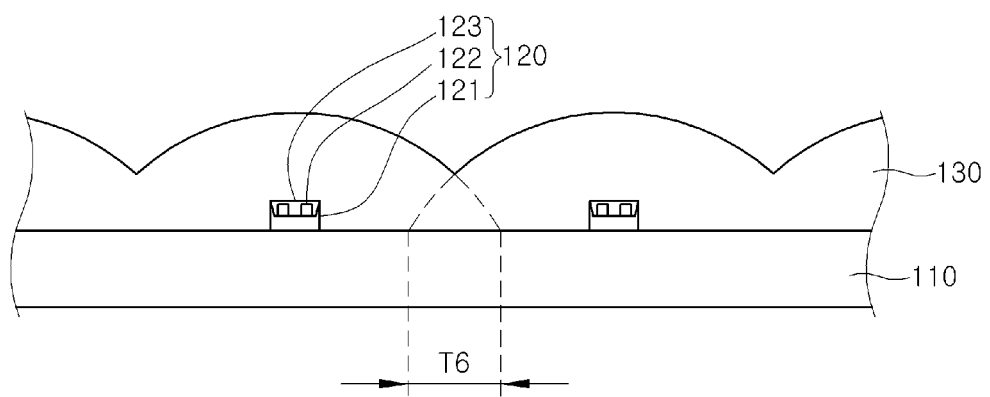
FIG. 4 is a cross-sectional view of the LED lamp shown in FIG. 3, taken along line C-C.
Figure 5:
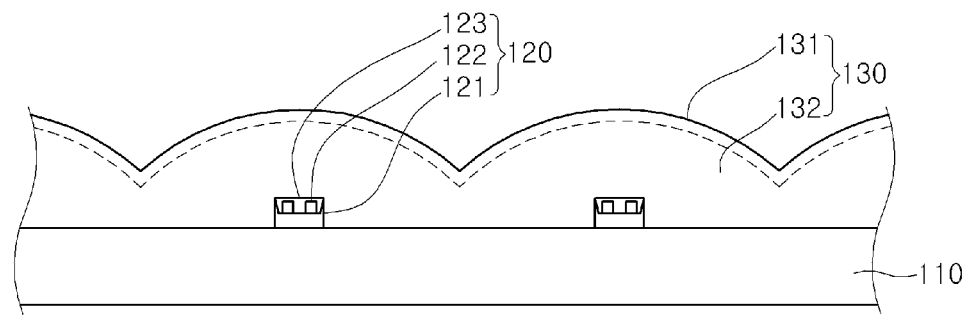
FIG. 5 is a cross-sectional view of an LED lamp according to a modification of the first exemplary embodiment.
Figure 6:
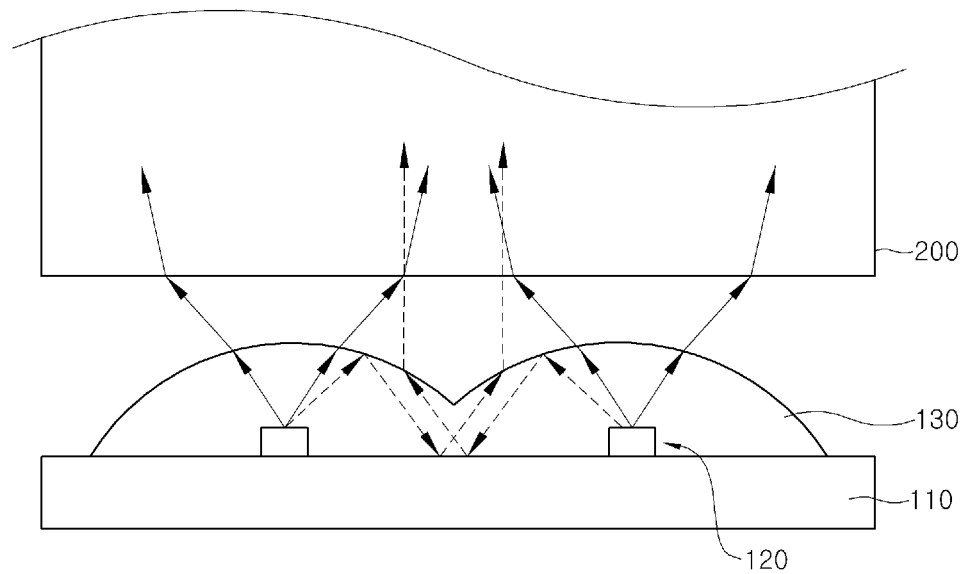
FIG. 6 is a cross-sectional view illustrating an operation of the backlight assembly according to the first exemplary embodiment.

FIG. 1 is a perspective view of a backlight assembly according to a first exemplary embodiment of the invention. FIG. 2 is a perspective view of an LED lamp according to the first exemplary embodiment. FIG. 3 is a partial plan view of the LED lamp shown in FIG. 2. FIG. 4 is a cross-sectional view of the LED lamp shown in FIG. 3, taken along the line C-C. FIG. 5 is a cross-sectional view of an LED lamp according to a modification of the first exemplary embodiment. FIG. 6 is a cross-sectional view illustrating an operation of the backlight assembly according to the first exemplary embodiment.

Referring to FIG. 1, FIG. 2, FIG. 3, FIG. 4, FIG. 5, and FIG. 6, the backlight assembly according to the first exemplary embodiment includes an LED lamp 100 and a light guide plate 200 that is arranged proximate to the LED lamp 100.

The LED lamp 100 includes a substrate 110, a plurality of LED packages 120 arranged on the substrate 110, and a lens unit 130 sealing the LED packages 120.

The substrate 110 is arranged in a bar shape and may correspond to a side wall of the light guide plate 200. More specifically, a length of the substrate 110 may correspond to a length of the side wall of the light guide plate 200. Further, a width of the substrate 110 may correspond to a width of the side wall of the light guide plate 200. Alternatively, a width of the substrate 110 may be wider or narrower than the width of the side wall of the light guide plate 200.

The substrate 110 may be a Metal Core Printed Circuit Board (MCPCB) substrate having an electrode pattern (not shown) on its upper surface. The upper surface of the substrate 110 may be a surface on which the LED packages 120 are arranged. With this structure, heat from the LED packages 120 may be dissipated rapidly. Though not shown, in this exemplary embodiment, a white insulating film may be coated on an upper surface of the substrate 110. However, the invention is not limited thereto. For example, a reflecting film (not shown) may be arranged on the upper surface of the substrate 110. In addition, though not shown in the drawing, a fixing member having a fixing groove or a fixing protrusion for fixing the substrate 110 may be provided on a side of the substrate 110.

A plurality of LED packages 120 are arranged on the above-described substrate 110. In the first exemplary embodiment, as shown in FIG. 1 and FIG. 2, six LED packages 120 are arranged on the substrate 110. However, the invention is not limited thereto. The number of LED packages 120 to be arranged on the substrate 110 may be more than six or less than six, and may depend upon such factors including the light-emission efficiency of the LED package 120 and the length of the substrate 110. The plurality of LED packages 120 may be connected together in parallel and/or in series. In the first exemplary embodiment, the six LED packages 120 are connected in series.

As shown in FIG. 3 and FIG. 4, an LED package 120 includes a main body 121, an LED unit 122 to emit light having a predetermined color, and a molding 123 to mold the LED unit 122. Further, though not shown, the LED package 120 may include a metal wiring line to supply power to the LED unit 122. The LED package 120 may include LED units 122 that emit red light, green light, or blue light. The LED package 120 can emit white light by emitting red light, green light, and blue light emitted from the individual LED units 122. In the first exemplary embodiment, as shown in FIG. 3, the LED package 120 includes a red LED unit 122 that emits red light, two green LED units 122 that emit green light, and one blue LED unit 122 that emits blue light. However, the invention is not limited thereto. For example, the LED package 120 may include at least one white LED unit 122 that emits white light. The molding 123 may be formed of a transmissive silicon material.

In the first exemplary embodiment, as shown in FIG. 2, FIG. 3, and FIG. 4, the lens unit 130 includes a plurality of lenses that are arranged to overlap with each other. As shown, the lenses of the lens unit 130 are substantially semi-ellipsoids. Then, the LED packages 120 may be provided at centers of the plurality of semi-ellipsoidal lenses. A material having a different refractive index, such as air, should not be arranged between the lens unit 130 and the LED packages 120. In regions between the LED packages 120, the lenses overlap with each other. In the first exemplary embodiment, as shown in FIG. 3 and FIG. 4, a length T6 of an overlapping region of two lenses may be about ten percent (10%) to about eighty percent (80%) of a major axis length T1 of each lens.

Then, light from the LED packages 120 can be diffused by the lens unit 130 that seals the plurality of LED packages 120 and has a plurality of semi-ellipsoidal lenses. Further, light is reflected to the overlap region of the lenses between the LED packages 120, and thus light-emission efficiency in the region between the LED packages 120 can be improved. More specifically, light emitted from the LED package 120, shown as a solid arrow in FIG. 6, may be refracted at a boundary of the lens unit 130 and air and then may be incident on the light guide plate 200. Through the refraction at a boundary of the lens unit 130 and air, light emitted from the LED packages 120 can be diffused. Further, light emitted from the LED package 120, shown as a dashed arrow in FIG. 6, may be reflected at the surface of the lens unit 130 back towards the substrate 110. This reflected light may be reflected by the substrate 110 again, and refracted at the boundary of the lens unit 130 and air. Subsequently, this light may be incident on the light guide plate 200. Accordingly, in the first exemplary embodiment, light emitted from the LED package 120 can be reflected to an overlap region between the LED packages 120 by the continuous lens unit 130, thereby improving luminance of the region between the LED packages 120. Thus, a variation in luminance of light incident on the light guide plate 200 can be reduced.

The lens unit 130 may be formed in a single body or may be formed by incorporating different parts.

Where the lens unit 130 is formed as a single body, a mold (not shown) having an internal space corresponding to the lenses of the lens unit 130 is prepared. Then the substrate 110 on which the LED packages 120 are arranged is fixed onto the mold. A transmissive silicon material is injected into the internal space of the mold and then is cured. Subsequently, the mold is removed, and the lens unit 130 having the lens is formed on the substrate 110.

Where the lens unit 130 is formed as different parts, a plurality of lenses each having a major axis length larger than the length between the LED packages 120 are prepared. Both ends of each convex lens are cut such that the length of the convex lens is consistent with the length between the LED packages 120. Subsequently, the plurality of convex lenses having cut ends may be adhered to one another to form the lens unit 130.

Further, as a modification to the first exemplary embodiment, as shown in FIG. 5, the lens unit 130 may include a lens main body 131 that seals the LED packages 120 and has a plurality of convex lenses provided to partially overlap each other, and a filler 132 arranged between the lens main body 131 and the LED packages 120. The lens main body 131 and the filler 132 may be formed of materials having the same refractive index or of the same material.

In the above description, a single lens unit 130 seals a plurality of LED packages 120 arranged on the substrate 110. However, the invention is not limited to this structure. For example, each LED package 120 of a plurality of LED packages 120 may be sealed by a single lens unit 130 arranged on the substrate.

Hereinafter, an LCD including the above-described backlight assembly will be described.

Figure 7:
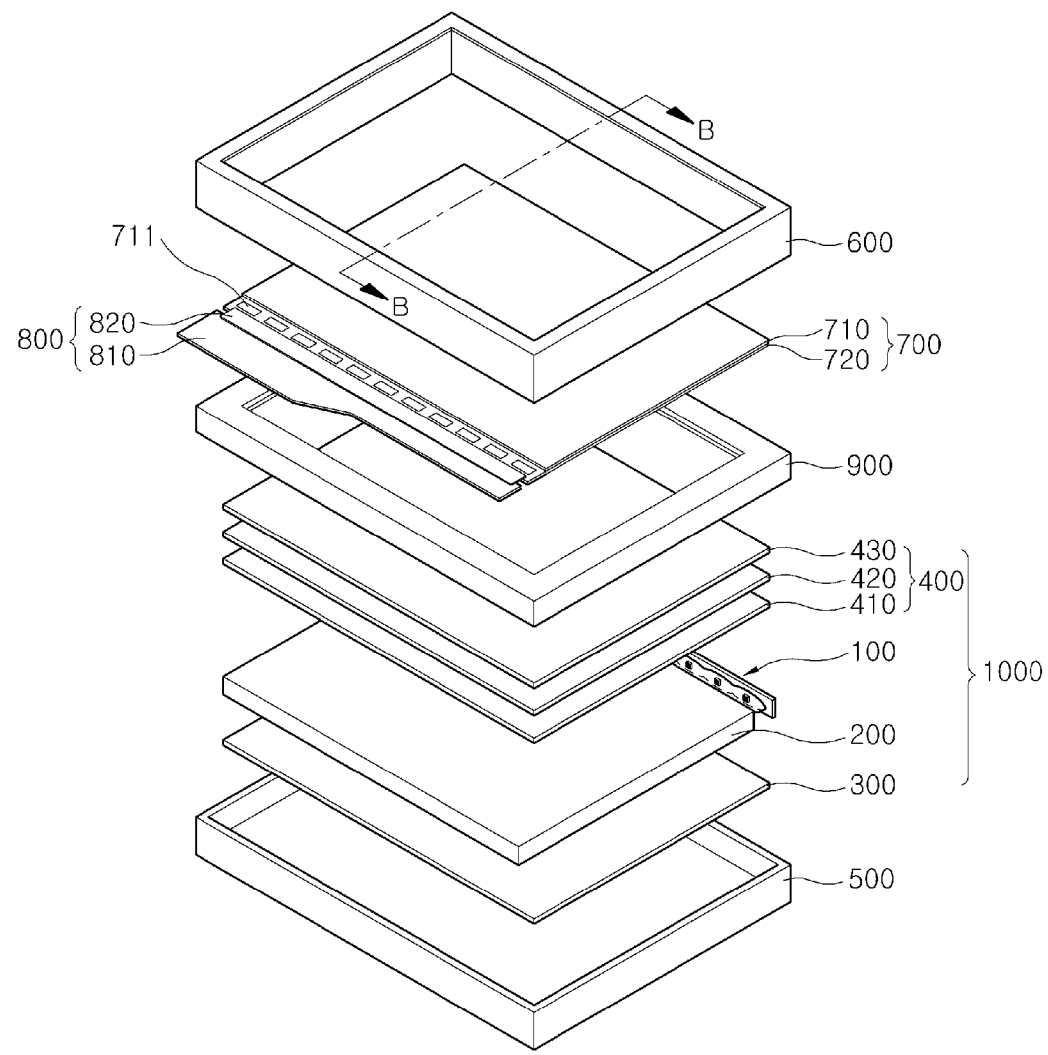
FIG. 7 is an exploded perspective view of an LCD including the backlight assembly according to the first exemplary embodiment of the invention.
Figure 8:
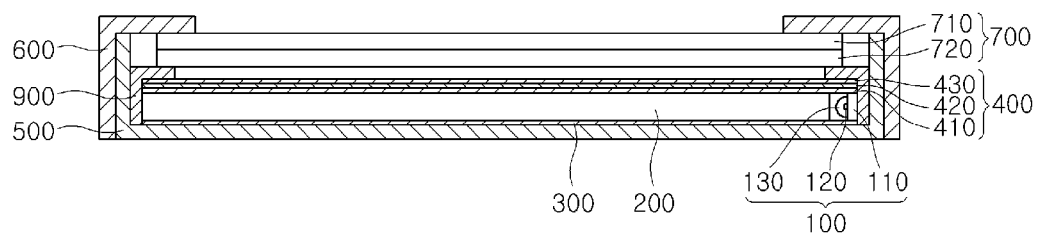
FIG. 8 is a cross-sectional view of the LCD shown in FIG. 7, taken along line B-B.

FIG. 7 is an exploded perspective view of an LCD including the backlight assembly according to the first exemplary embodiment of the invention. FIG. 8 is a cross-sectional view of the LCD shown in FIG. 7, taken along line B-B.

Referring to FIG. 7 and FIG. 8, the LCD according to the first exemplary embodiment includes a backlight assembly 1000 including the LED lamp 100 having the lens unit 130 sealing the plurality of LED packages 120 as a light source. The LCD also includes an LCD panel 700, a mold frame 900 on which the backlight assembly 1000 is mounted, a lower housing member 500 that houses the backlight assembly 1000, and an upper housing member 600 that surrounds the LCD panel 700 and a predetermined region and sides of the backlight assembly 1000.

The liquid crystal display panel 700 includes a color filter substrate 710 and a thin film transistor (TFT) substrate 720. The color filter substrate 710 may be a substrate on which red, green, and blue (RGB) pixels are formed by a thin film process. A common electrode formed of a transparent conductor, such as indium tin oxide (ITO) or indium zinc oxide (IZO), may be arranged on substantially the entire surface of the color filter substrate 710. The TFT substrate 720 may be a transparent glass substrate on which TFTs are formed in a matrix shape. Gate lines, data lines, pixel electrodes, storage electrodes, and other associated circuitry components may be formed on the TFT substrate 720. Polarizing plates (not shown) may also be provided in an upper portion of the color filter substrate 710 and a lower portion of the TFT substrate 720.

A driving circuit unit 800 is connected to a side of the LCD panel 700. The driving circuit unit 800 includes a printed circuit board 810 to receive external data signals and power signals and to provide these signals to the LCD panel 700, and a flexible printed circuit board 820 that connects the printed circuit board 810 and the LCD panel 700. In the first exemplary embodiment, as shown in FIG. 7, control Integrated Circuits (ICs) 711 are arranged on the TFT substrate 720 of the liquid crystal display panel 700. However, the invention is not limited hereto. For example, the control ICs 711 may be arranged on the printed circuit board 810 or the flexible printed circuit board 820. In addition, though not shown in the drawing, a gate stage unit that receives gate signals from the printed circuit board 810 and supplies them to the gate lines may be arranged on a side of the TFT substrate 720.

The backlight assembly 1000 of the first exemplary embodiment includes a reflecting plate 300, the LED lamp 100, the light guide plate 200, and optical sheets 400.

The LED lamp 100 may be as described above with reference to FIG. 1, FIG. 2, FIG. 3, FIG. 4, FIG. 5, and FIG. 6, and repetitive description will be omitted. For the light guide plate 200, a wedge type plate or a parallel flat plate may be used. Further, the light guide plate 200 may be formed of a material having high strength and good transmittance of light, such as polymethylmethacrylate (PMMA), so that it may resist deformation or breakage.

The reflecting plate 300 is arranged below the light guide plate 200. For the reflecting plate 300, a plate having high reflectance may be used. The reflecting plate 300 reflects light incident to the rear surface of the light guide plate 200 back towards the light guide plate 200 again to reduce light loss.

Optical sheets 400 are arranged above the light guide plate 200. The optical sheets 400 include a diffusing sheet 410, a polarizing sheet 420, and a luminance improving sheet 430. The diffusing sheet 410 directs light incident from the lower light guide plate 200 toward the front surface of the LCD panel 700, diffuses light to have a more uniform distribution over the surface of the LCD panel 700, and irradiates light onto the LCD panel 700. The polarizing sheet 420 converts an incident light component that is oblique to the polarizing sheet 420 to be emitted vertically. In order to convert light from the diffusing sheet 410 to be emitted vertically, at least one polarizing sheet 420 may be arranged below the LCD panel 700. The luminance improving sheet 430 transmits light parallel to its transmission axis and reflects light perpendicular to the transmission axis. In order to increase transmission efficiency, the transmission axis of the luminance improving sheet 430 may correspond to a polarization axis of the polarizing sheet 420.

The backlight assembly 1000 is housed in the lower housing member 500. The lower housing member 500 is arranged to have a box shape of a rectangular parallelepiped with an opened top surface, and a housing space is formed therein. The reflecting plate 300 is arranged at a lower surface of the lower housing member 500, and the light guide plate 200 and the LED lamp 100 are arranged on the reflecting plate 300. The optical sheets 400 are arranged on the light guide plate 200 and the LED lamp 100.

In the first exemplary embodiment, the mold frame 900 is arranged on the backlight assembly 1000 to fix and support the backlight assembly 1000 in the lower housing member 500. The LCD panel 700 is arranged on the mold frame 900. The upper housing member 600 is arranged on the LCD panel 700 so as to secure the LCD panel 700 from separating. The lower housing member 500 and the upper housing member 600 collectively and individually protect the LCD panel 700 and the backlight assembly 1000 from external impact. Thus, the upper housing member 600 and the lower housing member 500 may be formed of a strong but light-weight metal that is resistant to deformation.

The LCD according to the invention is not limited to the above-described edge type backlight assembly. Hereinafter, an LCD having a direct-type backlight assembly including the LED lamp of the first exemplary embodiment will be described.

Figure 9:
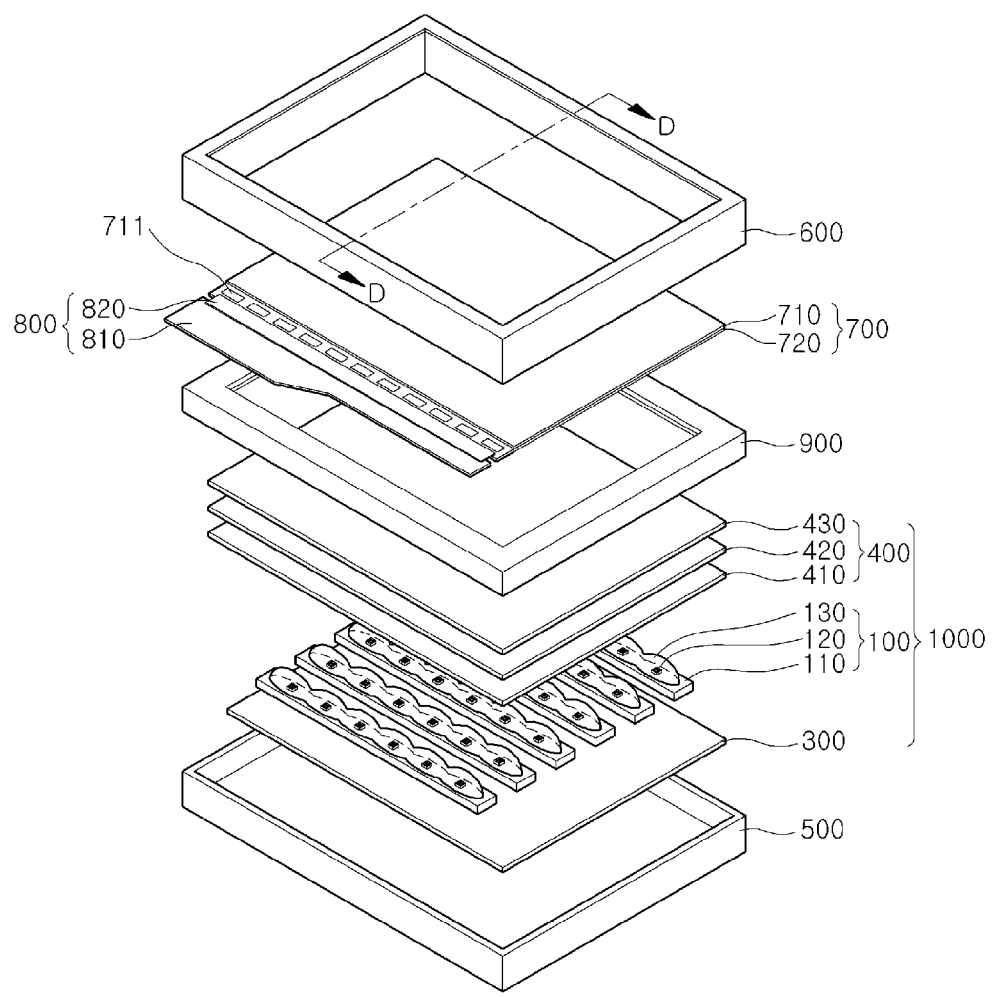
FIG. 9 is an exploded perspective view of an LCD according to a second exemplary embodiment of the invention.
Figure 10:
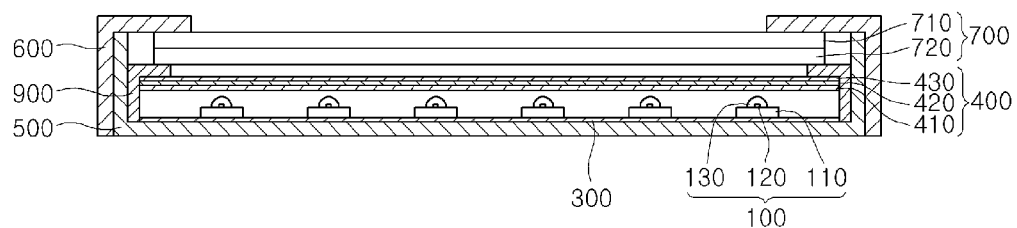
FIG. 10 is a cross-sectional view of the LCD shown in FIG. 9, taken along line D-D.

FIG. 9 is an exploded perspective view of an LCD according to a second exemplary embodiment of the invention. FIG. 10 is a cross-sectional view of the LCD shown in FIG. 9, taken along line D-D.

A description will be given for the LCD of this exemplary embodiment, with an emphasis on the structure that differs from the structure of the above-described first exemplary embodiment.

Referring to FIG. 9 and FIG. 10, the LCD according to the second exemplary embodiment includes a backlight assembly 1000 that has a plurality of LED lamps 100, a lower housing member 500 that houses the backlight assembly 1000, an LCD panel 700 that is provided above the backlight assembly 1000, and an upper housing member 600 that fixes the LCD panel 700.

The backlight assembly 1000 of this exemplary embodiment includes a reflecting plate 300 arranged at a lower surface of the lower housing member 500, a plurality of LED lamps 100 arranged on the reflecting plate 300, and optical sheets 400 arranged above the plurality of LED lamps 100.

Here, as in the first exemplary embodiment, each LED lamp 100 includes a substrate 110, a plurality of LED packages 120 arranged on the substrate 110, and a lens unit 130 to seal the LED packages 120. The substrate 110 of the LED lamp 100 may be fixed to the lower housing member 500. Further, the plurality of LED lamps 100 may be connected in series and/or in parallel. When the LED lamps 100 are arranged at substantially uniform intervals, luminance of the backlight assembly 1000 can be improved. The plurality of LED lamps 100 may be disposed close to each other. In addition, as described above, the lens unit 130 having semi-ellipsoidal lenses overlapping with each other may be used in order to diffuse light emitted from the LED packages 120, thereby reducing a variation in luminance.

The backlight assembly and the LCD of the invention are not limited to the above description. For example, the lens unit may have semi-ellipsoid lenses that are arranged close to each other but not overlapping with each other. Hereinafter, a backlight assembly according to a third exemplary embodiment of the invention will be described with reference to the drawings. The descriptions of the same parts as those in the first and second exemplary embodiments will be omitted. The technology of the third exemplary embodiment described below can be applied to the above-described first and second exemplary embodiments.

Figure 11:
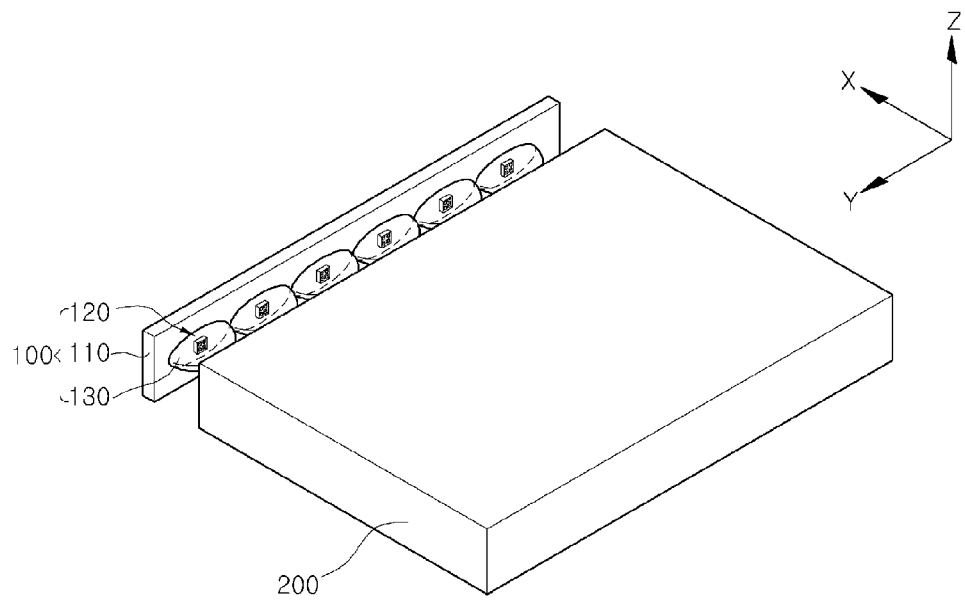
FIG. 11 is a perspective view of a backlight assembly according to a third exemplary embodiment of the invention.
Figure 12:
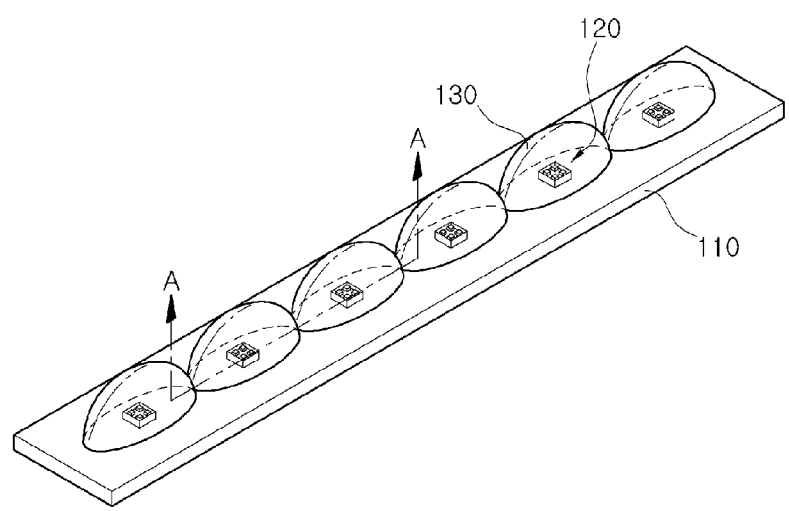
FIG. 12 is a perspective view of an LED lamp according to the third exemplary embodiment.
Figure 13:
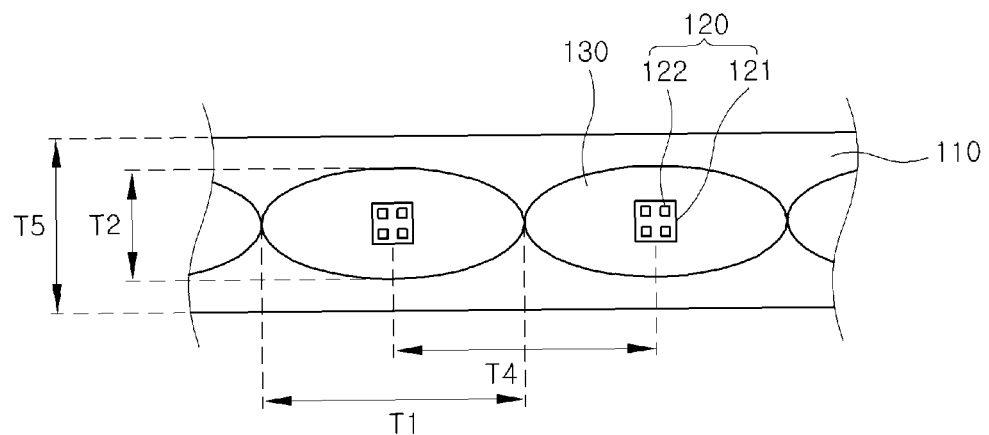
FIG. 13 is a partial plan view of the LED lamp shown in FIG. 12.
Figure 14:
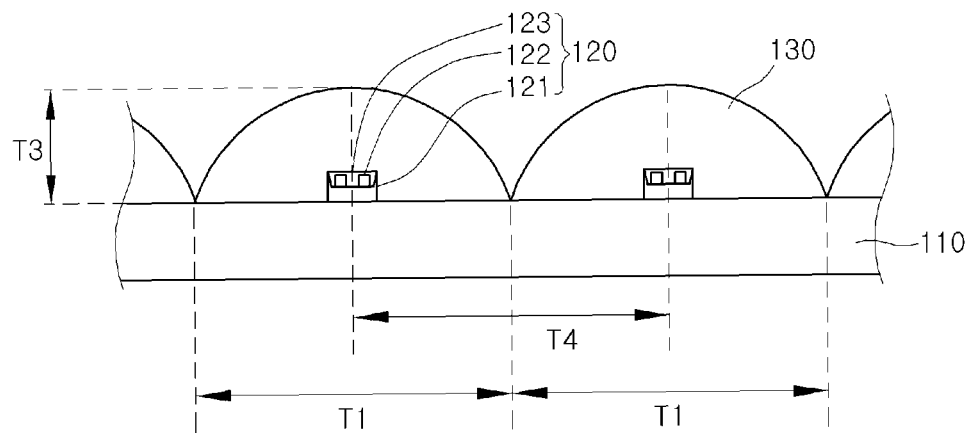
FIG. 14 is a cross-sectional view of the LED lamp shown in FIG. 12, taken along line A-A.
Figure 15:
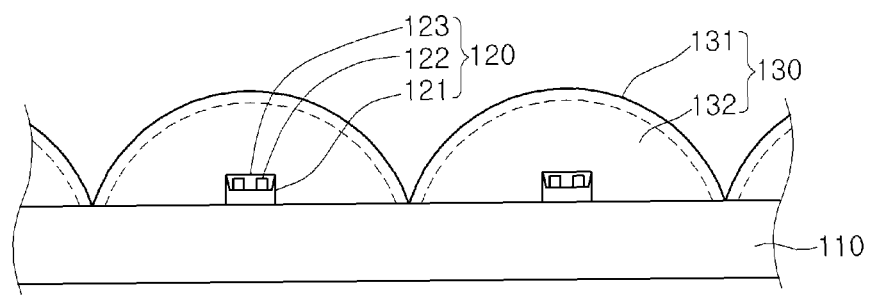
FIG. 15 is a cross-sectional view of an LED lamp according to a modification of the third exemplary embodiment.
Figure 16A:
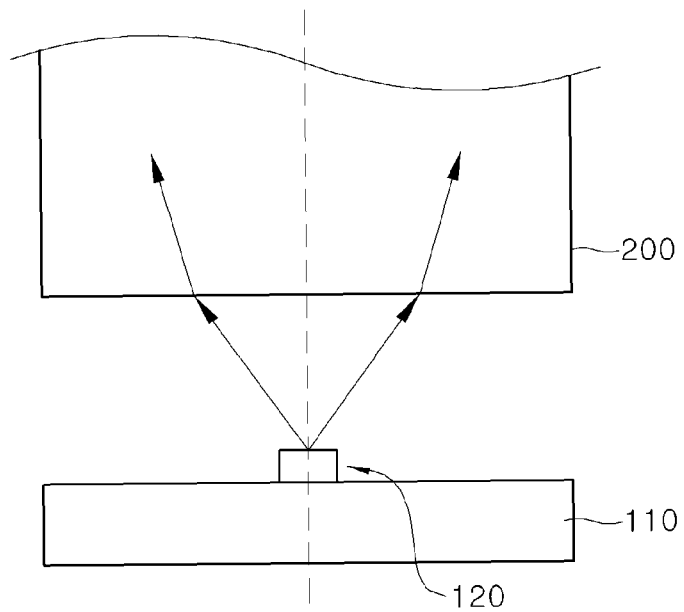
FIG. 16A is a cross-sectional view illustrating an operation of a conventional backlight assembly.
Figure 16B:
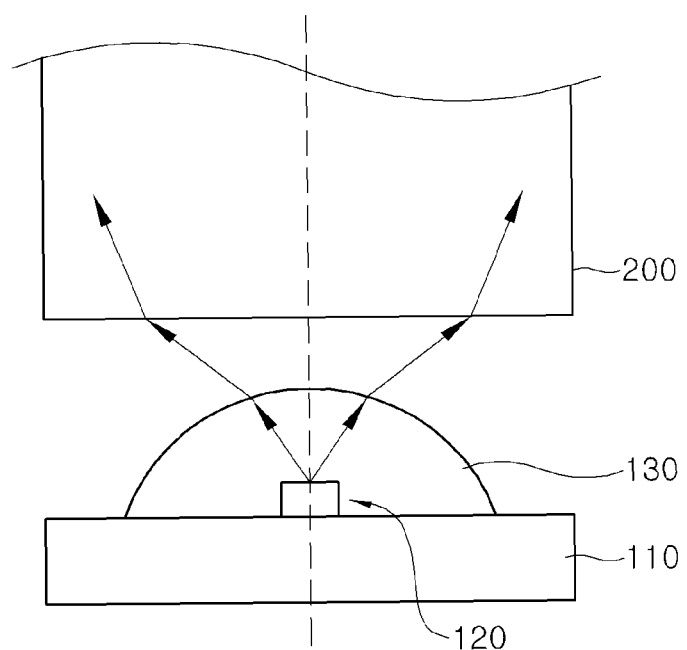
FIG. 16B is a cross-sectional view illustrating operation of the backlight assembly according to the third exemplary embodiment.

FIG. 11 is a perspective view of a backlight assembly according to a third exemplary embodiment of the invention. FIG. 12 is a perspective view of an LED lamp according to the third exemplary embodiment. FIG. 13 is a partial plan view of the LED lamp shown in FIG. 12. FIG. 14 is a cross-sectional view of the LED lamp shown in FIG. 12, taken along line A-A. FIG. 15 is a cross-sectional view of an LED lamp according to a modification of the third exemplary embodiment. FIG. 16A is a cross-sectional view illustrating an operation of a conventional backlight assembly. FIG. 16B is a cross-sectional view illustrating operation of the backlight assembly according to the third exemplary embodiment.

Referring to FIG. 11, FIG. 12, FIG. 13, FIG. 14, and FIG. 15, the backlight assembly according to the third exemplary embodiment includes an LED lamp 100, and a light guide plate 200 arranged proximate to the LED lamp 100.

The LED lamp 100 includes a substrate 110, a plurality of LED packages 120 arranged on the substrate 110, and a plurality of lens units 130 that are arranged to seal the LED packages 120. As shown in the drawing, lens units 130 are arranged proximate to each other but do not overlap with each other.

In the third exemplary embodiment, each lens unit 130 has a convex lens shape and seals a corresponding LED package 120. The shape of the lens may be a semi-ellipsoid, but is not limited hereto. The light guide plate 200 close to the LED lamp 100 has a sidewall surface with a short length in a Z-axis direction and an increased length in a Y-axis direction. Accordingly, in the third exemplary embodiment, a dimension of a lens unit 130 in an X-axis direction of the LED package 120 is increased, and a dimension of a lens unit 130 in the Z-axis direction is reduced.

Referring to FIG. 16A, when the lens unit 130 is not provided, light emitted from the LED package 120 is not sufficiently diffused and is directly incident on the light guide plate 200 through air. More specifically, light emitted from the LED package 120 transmits through air having a small refractive index and is then incident on the light guide plate 200 having a large refractive index. Therefore, a refraction angle at an interface between air and the light guide plate 200 is smaller than an incident angle on the light guide plate 200, and thus light incident on the light guide plate 200 is not widely diffused. In contrast, when the semi-ellipsoidal lens unit 130 is provided, as shown in FIG. 16B, light emitted from the LED package 120 is refracted at the interface between the lens unit 130 and air, and then is incident on the light guide plate 200. Light emitted from the LED package 120 is diffused by refraction at the interface between the lens unit 130 having a large refractive index and air having a small refractive index. Accordingly, as shown in FIG. 16B, when the lens unit 130 is provided, light emitted from the LED package 120 can be better diffused. Therefore, the lens unit 130 may reduce locally occurring dark and bright portions in the light guide plate 200, on which light from the LED package 120 is incident.

Further, the diffusion of light by the lens unit 130 can be adjusted by controlling the major axis length T1, the minor axis length T2, and the thickness T3 of the lens unit 130. Referring to FIG. 13 and FIG. 14, the major axis length T1 of the semi-ellipsoidal lens unit 130 may be selected to be consistent with the length T4 between adjacent LED packages 120. However, the invention is not limited to this structure, and adjacent lens units 130 may be spaced apart from each other by a predetermined distance.

The minor axis length T2 may be selected from a range of about fifty percent (50%) to about one-hundred percent (100%) of a width of a width T5 of the substrate 110. The thickness T3 of the lens unit 130 may be selected from a range of about thirty percent (30%) to about one-hundred percent (100%) of a distance between the substrate 110 and the light guide plate 200.

Simulations have been performed for this third exemplary embodiment, and luminance has been measured when the lens unit 130 is not provided, when the lens units 130 are spaced apart from each other, and when the lens units 130 are arranged proximate to each other. More specifically, light luminance has been measured at a position in the light guide plate 200 spaced 3.2 mm apart from the side wall surface of the light guide plate 200 receiving light from the LED lamp 100, and a difference between the highest luminance value and the lowest luminance value has been calculated as luminance scattering.

First, when the lens unit 130 is not provided, luminance scattering was determined to be 58. Second, when the lens units 130 are spaced apart from each other, and more specifically when the major axis length T1 of the lens unit 130 is 6 mm, the minor axis length T2 of the lens unit 130 is 4 mm, and the thickness T3 of the lens unit 130 is 1.5 mm, luminance scattering was determined to be 41. Third, when the lens units 130 are arranged proximate to each other, and more specifically when the major axis length T1 is 8.25 mm, the minor axis length T2 of the lens unit 130 is 4 mm, and the thickness T3 of the lens unit 130 is 1.5 mm, luminance scattering was determined to be 41. As such, it can be seen that luminance scattering is reduced by approximately 17 when the lens units 130 are arranged proximate to each other as compared with when the lens unit 130 is not provided. Thus, a variation between bright components and dark components of light incident on the light guide plate 200 is reduced. As described above, this is because light emitted from the LED package 120 is refracted at the interface between the lens unit 130 and air, and is widely diffused.

In the third exemplary embodiment, the lens unit 130 may be formed of a transmissive silicon material, which may be the same material or a material having the same refractive index as the molding 123 of the LED package 120. Accordingly, refraction of the light emitted from the LED unit 122 of the LED package 120 at the interface between the molding 123 and the lens unit 130 can be prevented. In addition, the lens units 130 may be formed as a single body, thereby preventing light from being refracted at the interfaces between adjacent lens units 130. However, the invention is not limited hereto. For example, the lens unit 130 may be formed of transmissive polymer resin, such as polystyrene (PS), polyethylene (PE), vinyl chloride (PVC), phenol (PE), or acryl (PMMA).

A method of manufacturing the LED lamp 100 having the lens units 130 will now be described in brief. The substrate 110 on which the LED packages 120 are arranged is prepared, and a mold (not shown) having an internal space corresponding to the lens units 130 is prepared. The substrate 110 may be arranged proximate to the mold such that the LED packages 120 are arranged in the internal spaces of the mold, and a transmissive silicon material is injected. Next, after the transmissive silicon material is cured and the mold is removed, the lens units 130 that seal the LED packages 120 are formed on the substrate 110 through a post process. At this time, for the injection of the transmissive silicon material, a through hole may be provided on the mold. Alternatively, a through hole may be provided on a side of the substrate. The transmissive silicon material may be injected through the through hole by an injection apparatus, such as a dispenser.

Alternatively, instead of the single body, the lens unit 130 of this exemplary embodiment may include a lens main body 131 that covers the LED package 120, and a filler 132 that is filled between the lens main body 131 and the LED package 120 as described above. The lens main body 131 and the filler 132 may be formed of materials having the same refractive index such that light refraction does not occur at an interfacing surface between the lens main body 131 and the filler 132. In this exemplary embodiment, the lens main body 131 and the lens unit 130 may be formed of transmissive silicon materials. The lens main body 131 may be formed to have a hollow, semi-ellipsoidal shape. In order to form the lens main body 131, the lens main body 131 may be formed using a silicon material, and then the LED package 120 may be mounted on the substrate 110. The lens main body 131 is then arranged above the LED package 120 and the LED package 120 is arranged at the center of the lens main body 131. The filler is injected between the lens main body 131 and the LED package 120 and then is cured. As a result, the lens unit 130 that seals the LED package 120 is formed on the substrate 110.

Hereinafter, an LCD including the above-described backlight assembly will be described.

Figure 17:
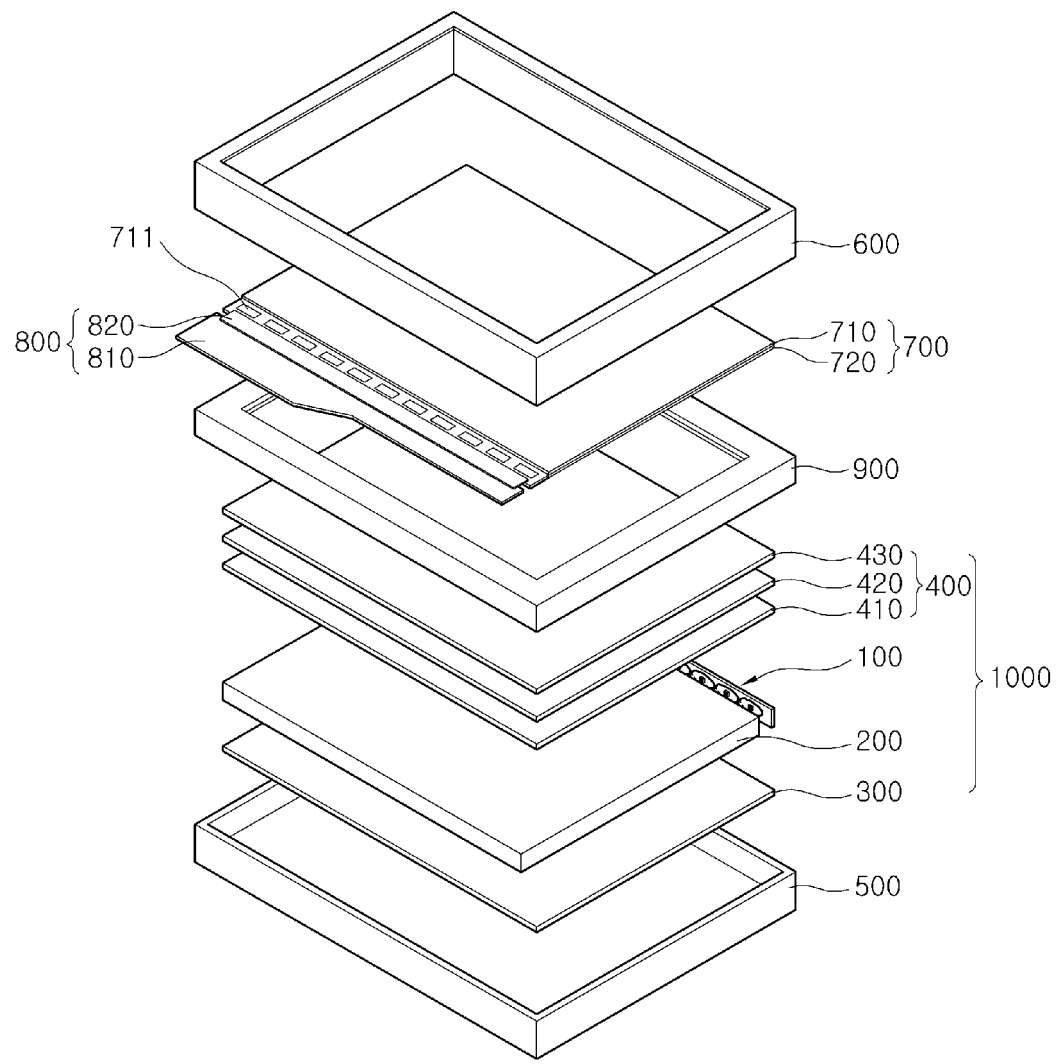
FIG. 17 is an exploded perspective view of an LCD including the backlight assembly according to the third exemplary embodiment of the invention.

FIG. 17 is an exploded perspective view of an LCD including the backlight assembly according to the third exemplary embodiment of the invention.

Referring to FIG. 17, an LCD according to the third exemplary embodiment may be similar to the LCD described above with reference to FIG. 1, FIG. 2, FIG. 3, FIG. 4, FIG. 5, and FIG. 6. However, the LCD according to the third exemplary embodiment may include a backlight assembly 1000 having the LED lamp 100 described above with reference to FIG. 11, FIG. 12, FIG. 13, FIG. 14, and FIG. 15.

As shown in FIG. 17, the LED lamp 100 is arranged at one side of the light guide plate 200. However, the invention is not limited hereto. For example, the LED lamps 100 may be arranged on other sides, such as opposing sides, of the light guide plate 200. Additionally, the LED lamps 100 shown in FIG. 17 may be used as a direct type backlight shown in FIG. 9.

As described above, according to the exemplary embodiments of the invention, since the lens units 130 seal the LED packages 120, it is possible to diffuse light emitted from the LED packages 120.

According to the exemplary embodiments of the invention, light of the LED packages may be diffused, and a variation in luminance of light incident on the light guide plate may be reduced, thereby reducing a hot spot phenomenon.

According to the exemplary embodiments of the invention, a space between the LED package and the lens sealing the LED package may be filled with a filler material formed of the same material as the lens. Therefore, light that is emitted from the LED packages and transmits toward an interface between the lens and air can be prevented from being refracted inside the lens.

According to the exemplary embodiments of the invention, a lens unit having a plurality of semi-ellipsoidal lenses provided to overlap each other may seal the LED packages, and thus light passes through a region between the LED packages to be diffused, thereby reducing dark portions of the LCD.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A light source module, comprising:
   a substrate;
   a first light source and a second light source disposed on the substrate;
   a first lens disposed on the first light source and comprising a lower surface facing the substrate; and
   a second lens disposed on the second light source;
   wherein the lower surface of the first lens has a first width in a first direction and a second width in a second direction different from the first direction, and
   wherein the first lens partially overlaps with the second lens in the first direction.

2. The light source module of claim 1, wherein the first width is greater than the second width.

3. The light source module of claim 2, wherein the first width is a largest width of the lower surface of the first lens and the second width is a smallest width of the lower surface of the second lens.

4. The light source module of claim 1, wherein the first direction is perpendicular to the second direction.

5. The light source module of claim 1, wherein the second lens comprises a lower surface facing the substrate and the lower surface of the second lens has a third width in the first direction and a fourth width different from the third width in the second direction.

6. The light source module of claim 1, wherein the first lens is a semi-ellipsoid and the first direction is parallel to a major axis of the semi-ellipsoid.

7. A backlight assembly, comprising:
   a light source module comprising:
   a substrate;
   a first light source and a second light source disposed on the substrate;
   a first lens disposed on the first light source and comprising a lower surface facing the substrate; and
   a second lens disposed on the second light source;
   a light guide plate to emit light incident from the light source module; and
   a housing member housing the light source module and the light guide plate,
   wherein the lower surface of the first lens has a first width in a first direction and a second width in a second direction different from the first direction, and
   wherein the first lens partially overlaps with the second lens in the first direction.

8. The backlight assembly of claim 7, wherein the light source is disposed close to a side wall of the light guide plate, and a thickness of the lens is in a range of about thirty percent to about one-hundred percent of a distance between the substrate and the side wall of the light guide plate.

9. The backlight assembly of claim 7, wherein the first width is greater than the second width.

10. The backlight assembly of claim 9, wherein the first width is a largest width of the lower surface of the first lens and the second width is a smallest width of the lower surface of the second lens.

11. The backlight assembly of claim 7, wherein the first direction is perpendicular to the second direction.

12. The backlight assembly of claim 7, wherein the second lens comprises a lower surface facing the substrate and the lower surface of the second lens has a third width in the first direction and a fourth width different from the third width in the second direction.

13. The backlight assembly of claim 7, wherein the first lens is a semi-ellipsoid and the first direction is parallel to a major axis of the semi-ellipsoid.

14. A liquid crystal display, comprising:
a liquid crystal display panel to display an image;
a backlight assembly to provide light onto the liquid crystal display panel; and
a housing member housing the liquid crystal display panel and the backlight assembly,
wherein the backlight assembly comprises:
a light source module comprising:
a substrate;
a first light source and a second light source disposed on the substrate;
a first lens disposed on the first light source and comprising a lower surface facing the substrate; and
a second lens disposed on the second light source; and
a light guide plate to emit light incident from the light source module;
wherein the lower surface of the first lens has a first width in a first direction and a second width in a second direction different from the first direction, and
wherein the first lens partially overlaps with the second lens in the first direction.

15. The liquid crystal display of claim 14, wherein the first width is greater than the second width.

16. The liquid crystal display of claim 15, wherein the first width is a largest width of the lower surface of the first lens and the second width is a smallest width of the lower surface of the second lens.

17. The liquid crystal display of claim 14, wherein the first direction is perpendicular to the second direction.

18. The liquid crystal display of claim 14, wherein the second lens comprises a lower surface facing the substrate and the lower surface of the second lens has a third width in the first direction and a fourth width different from the third width in the second direction.

19. The liquid crystal display of claim 14, wherein the first lens is a semi-ellipsoid and the first direction is parallel to a major axis of the semi-ellipsoid.

* * * * *